US011592660B2

(12) United States Patent
Overfelt et al.

(10) Patent No.: US 11,592,660 B2
(45) Date of Patent: Feb. 28, 2023

(54) SYSTEM AND METHOD FOR BINOCULAR TRIPOD ADAPTER WITH AUTOMATIC LOCKING ENGAGEMENT

(71) Applicant: BUSHNELL INC., Overland Park, KS (US)

(72) Inventors: Travis C. Overfelt, Lee's Summit, MO (US); Chad N. Van Brunt, Olathe, KS (US)

(73) Assignee: Bushnell Inc., Overland Park, KS (US)

( * ) Notice: Subject to any disclaimer, the term of this patent is extended or adjusted under 35 U.S.C. 154(b) by 0 days.

(21) Appl. No.: 17/358,849

(22) Filed: Jun. 25, 2021

(65) Prior Publication Data

US 2021/0373315 A1 Dec. 2, 2021

Related U.S. Application Data (63) Continuation of application No. 16/386,999, filed on Apr. 17, 2019, now Pat. No. 11,048,073.

(51) Int. Cl.
*G02B 23/16* (2006.01)
*G02B 23/18* (2006.01)
*F16M 11/20* (2006.01)

(52) U.S. Cl.
CPC ......... *G02B 23/18* (2013.01); *F16M 11/2021* (2013.01)

(58) Field of Classification Search
CPC ...... G02B 23/18; G02B 23/16; G02B 23/165; G02B 23/20; G02B 23/00; F16M 11/2021; F16M 13/08; F16M 1/00
(Continued)

(56) References Cited

U.S. PATENT DOCUMENTS 1,870,766 A  8/1932 Beistle
2,317,445 A  4/1943 Davidson et al.
(Continued)

FOREIGN PATENT DOCUMENTS

DE  202014001983 U1  6/2015
JP  2000111803 A   4/2000

OTHER PUBLICATIONS

Panhandle Precision, "Bushnell Forge 15x56 Binocular: First Look & Overview", <https://www.youtube.com/watch?v=7MXY3KdeW-4>, Mar. 8, 2019, 5 pages.
(Continued)

*Primary Examiner* — Nkeisha Smith
(74) *Attorney, Agent, or Firm* — Walter M. Egbert, III; Richard J. Brown; Reed Smith LLP (57) ABSTRACT

A binocular adapter including a base and a receiver joined together by a stanchion arm. The receiver being configured to receive a binocular stem in a stem aperture defined by a receiver head. The receiver head configured to rotate relative to a receiver stanchion. The binocular stem including a first and a second end. The first end including a connector configured to connect to a binocular. The second end, distal to the first end, including a stem extension configured to be received by the stem aperture. The second end further including a groove configured to be received in a spring clip disposed on the receiver stanchion for retaining the binocular stem. The receiver head including a fastener for securing the binocular stem within the stem aperture while it is engaged in the spring clip.

20 Claims, 13 Drawing Sheets (58) Field of Classification Search
USPC ...... 248/187, 100, 81, 75, 82, 102, 106, 109
See application file for complete search history.

(56) References Cited

U.S. PATENT DOCUMENTS

| | | | |
|---|---|---|---|
| 4,846,803 A | | 7/1989 | Emerson |
| 4,949,933 A | | 8/1990 | Stone |
| 5,365,293 A | | 11/1994 | Nakatani |
| 5,667,176 A | * | 9/1997 | Zamarripa ............... B60R 1/12 248/231.51 |
| 5,810,311 A | | 9/1998 | Davison |
| 6,053,458 A | * | 4/2000 | Meyer ................. F16L 3/1075 248/74.1 |
| 6,540,185 B2 | * | 4/2003 | Ishikawa ............... F16M 13/00 248/187.1 |
| 6,896,227 B2 | | 5/2005 | Ku |
| 7,905,459 B2 | * | 3/2011 | Cameron ............... G02B 23/18 248/176.1 |
| 8,264,771 B2 | | 9/2012 | Yamamoto |
| 8,418,973 B2 | | 4/2013 | Liu |
| 8,817,178 B2 | * | 8/2014 | Baker ................... G02B 23/18 396/428 |
| 9,720,306 B2 | | 8/2017 | Johnson |
| 10,310,249 B1 | | 6/2019 | Bentley |
| D900,906 S | | 11/2020 | Overfelt et al. |
| 2004/0056158 A1 | | 3/2004 | Stuart et al. |
| 2006/0175482 A1 | | 8/2006 | Johnson |
| 2008/0156948 A1 | | 7/2008 | Cameron et al. |
| 2010/0155549 A1 | | 6/2010 | Robinson |
| 2014/0061413 A1 | | 3/2014 | Bradfield |
| 2019/0117929 A1 | | 4/2019 | Reinberg |

OTHER PUBLICATIONS

Extended European Search Report in EP 20167686.3, dated Aug. 17, 2020, 7 pages.
European Examination Report for related EP Application No. 20167686.3, dated Nov. 3, 2022; pp. 1-4; European Patent Office; Munich, Germany.

* cited by examiner

SYSTEM AND METHOD FOR BINOCULAR TRIPOD ADAPTER WITH AUTOMATIC LOCKING ENGAGEMENT

RELATED APPLICATIONS

This application is a continuation of U.S. patent application Ser. No. 16/386,999, filed Apr. 17, 2019, the disclosure of which is hereby incorporated by reference in its entirety.

TECHNICAL FIELD

Aspects of the present disclosure generally relate to apparatuses and methods for binocular holding adapters.

BACKGROUND

Binoculars allow for increased perception of objects outside the sight range of a user, such as an outdoorsman. Binoculars are typically formed using two sets of lenses and prisms calibrated to magnify an image when viewed through them. In order to gain a clear picture of an object the binocular must remain steady and focused. Movement of the binocular may lead to losing sight of the object the user seeks to observe. Additionally, image resolution may be degraded by movement of the subject or object being viewed. The portability of binoculars allows a user to hold the binoculars, but leaves the stability of the binoculars subject to the steadiness of the user's posture.

Traditionally, binoculars have been attached to a stand for holding the binoculars steady using a clip within the stand. However, such devices and methods of securing binoculars have the drawback of allowing the binoculars to unclip when in use. Other devices for securing binoculars required complicated engagement components and/or long installation periods to properly secure the binoculars.

SUMMARY

The present disclosure generally provides for a lightweight, portable binocular adapter for securing a binocular to a platform, such as a stand, a monopod, bipod, tripod, or any of other various platforms known in the art. The adapter provides a user the ability to secure and reduce movement of the binocular, so they remain steady during use. The system and method mitigates instability of the view in the binoculars during use and allows for quick and easy installation and removal of the binoculars from the adapter.

According to the disclosure, the binocular adapter is configured to mount and secure the binocular. A binocular stem (hereinafter stem) is secured to the binocular for quick installation to and removal from the adapter. The stem may include a first end with a male connector such as threads or other connector(s) securing the stem to the binocular. A second end of the stem distal from the first end may have an extension with a groove or recess that is configured to be received by a receiver of the adapter.

The adapter includes a base and the receiver joined by a stanchion arm. The receiver may be disposed at an end of the adapter distal from the base. The base includes a base connector configured to connect with the platform, e.g. stand, monopod, bipod, or tripod, using a connection interface appropriate to the applicable platform. The receiver includes a receiver head connected to a receiver stanchion configured for mounting the receiver head, such as by a pin or set screw, about which the receiver head may rotate relative to the receiver stanchion. A stem aperture configured to receive the stem extension may be formed by the receiver head.

The receiver head may be configured to rotate or actuate between an opened position, wherein the stem extension may be inserted or removed from the stem aperture in the receiver head, and a closed position wherein the stem extension (and stem) may be locked into the receiver head/receiver. The receiver head illustratively may rotate 45 degrees between the opened and closed position, to facilitate ease of engagement of the stem into the stem aperture. When the stem is removed from the stem aperture of the receiver head of the adapter, the receiver head may be held in the opened position by a spring. The receiver head and stanchion may be configured with respective portions that abut or engage to limit the receiver head's range of motion relative to the receiver stanchion. With the stem extension inserted into the stem aperture of the receiver head, the receiver head may be pivoted (e.g., down) to a point where the recess or groove in the stem extension engages, and is captured within, a spring clip disposed on the receiver stanchion. Upon closing the receiver head, the receiver head may abut the receiver stanchion. In the closed position, with the stem extension installed, it is held within the stem aperture while the receiver head is pivoted down in the closed position. A fastener, such as a thumb screw, may be tightened against the stem to prevent movement of the stem and thereby prevent movement and rotation of the binocular that may be engaged with the stem.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details.

Figure 1A:
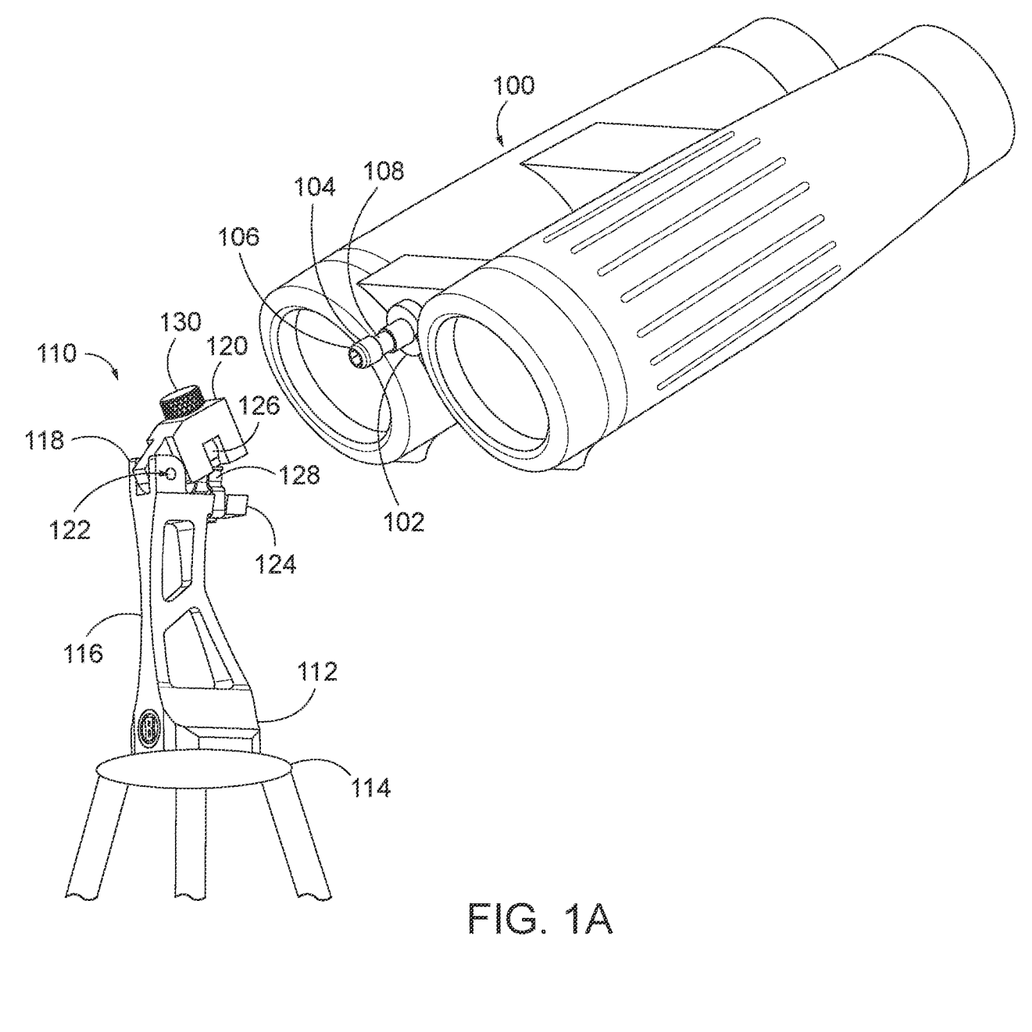
FIG. 1A illustrates a binocular secured to a stem receivable by an embodiment of a binocular adapter on a platform according to the disclosure.
Figure 1B:
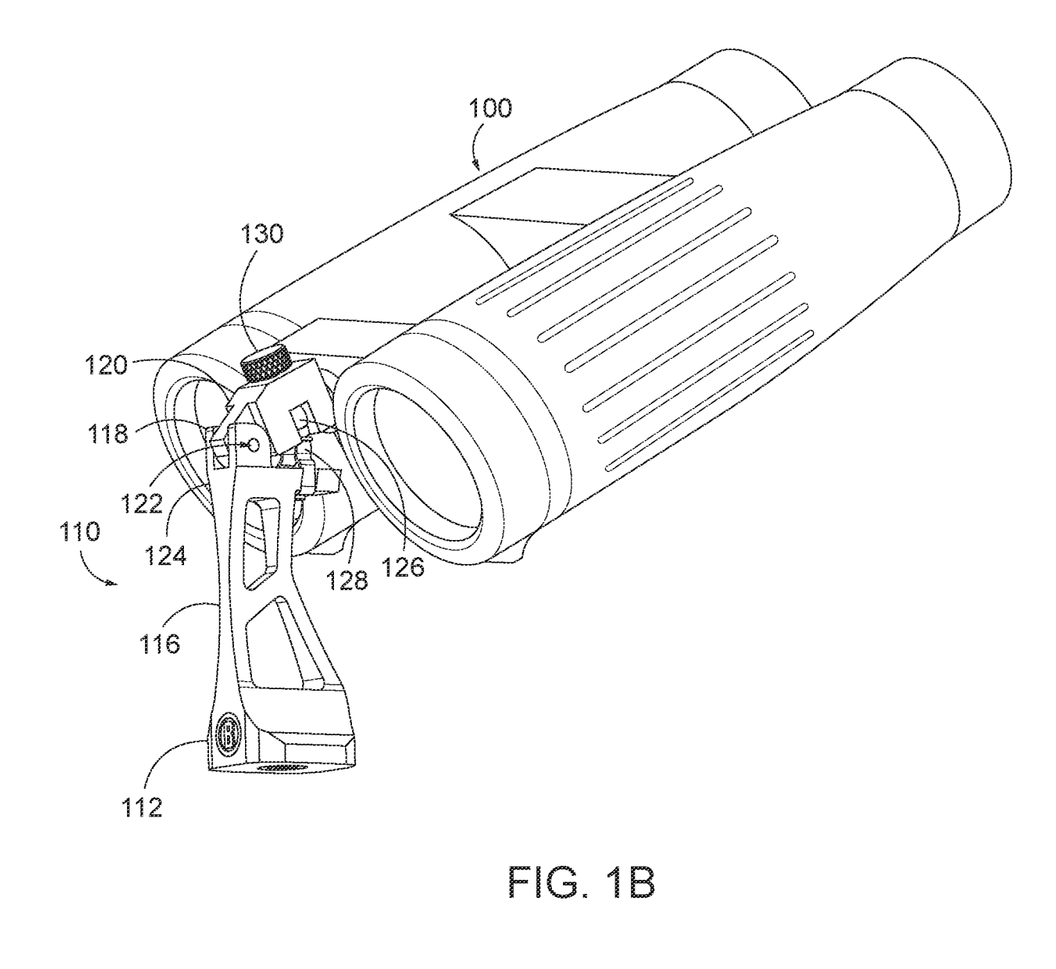
FIG. 1B illustrates the embodiment of the binocular adapter of FIG. 1A configured to receive a binocular in the adapter.
Figure 1C:
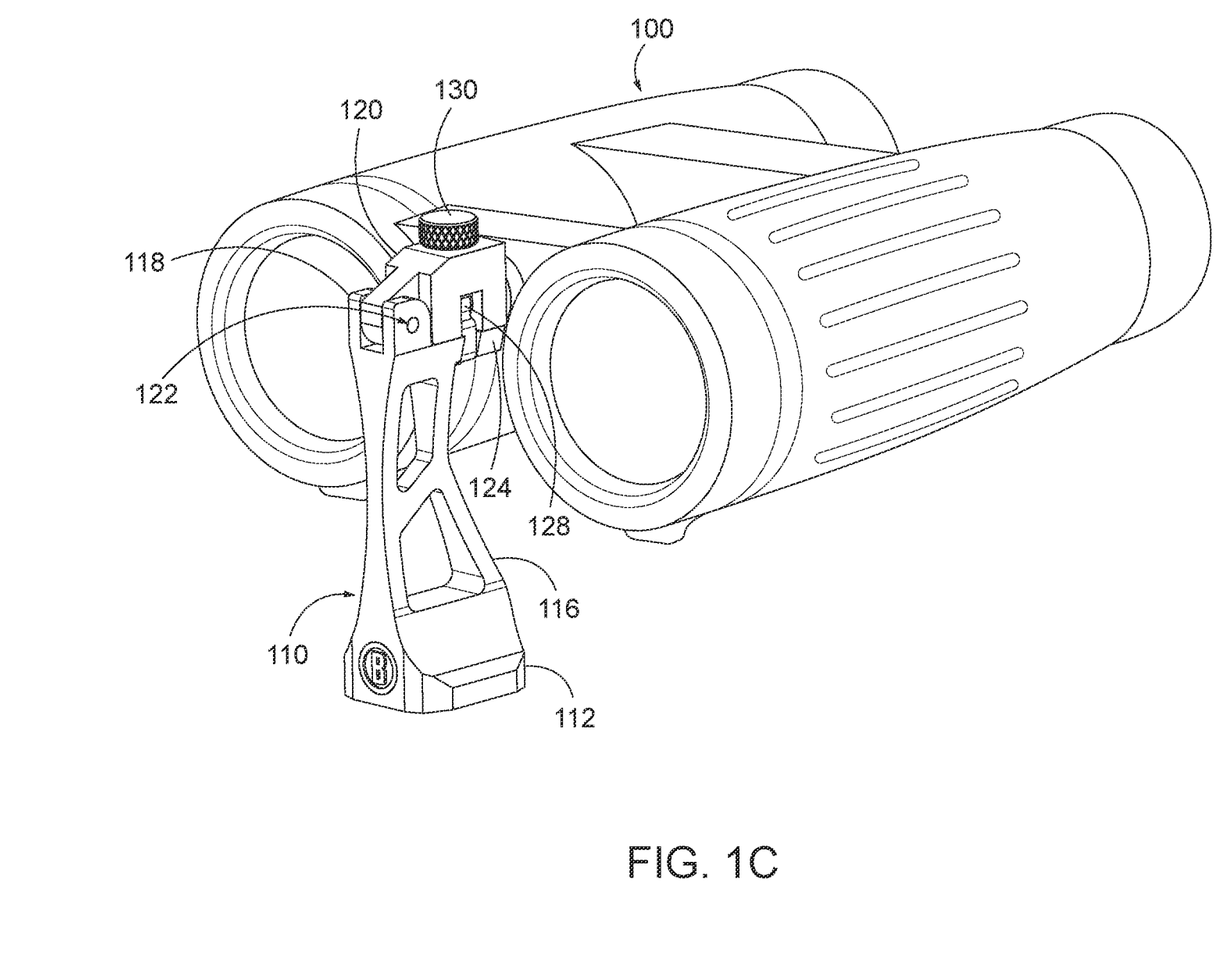
FIG. 1C illustrates the embodiment of the binocular adapter of FIG. 1A securing a binocular in place.

FIGS. 1A-1C illustrate a binocular 140 secured to a binocular stem 102 (hereinafter "stem") receivable by an embodiment of a binocular adapter 110, according to the disclosure, on a platform 114 (in this illustration, for example, the platform is a tripod). The platform 114 may be a stand, monopod, bipod, tripod, or any of various other stabilizing platforms known in the art.

Referring to FIG. 1A, the binocular 140 may be operatively connected to the stem 102. The stem 102 may include a first end (not shown) with a connector such as threads or other connectors as known in the art for securing the stem 102 to the binocular 140. A second end 104 of the stem 102 distal from the first end may comprise a stem extension 106 having a groove or recess 108.

The adapter 110 includes a base 112 and a receiver 118 joined by a stanchion arm 116 disposed between the base 112 and receiver 118. The base 112 includes a base connector (not shown in this view) for interconnecting the adapter 110 to the platform 114. The receiver 118 includes a receiver head 120. The receiver head 120 is connected to a receiver stanchion 124 that extends outwardly from the receiver 118. The connection of the receiver head 120 to the receiver stanchion 124, in this illustrative embodiment, is made using a rotatable pin 122, about which the receiver head 120 may rotate relative to the receiver stanchion 124. The receiver head 120 may have a stem aperture 126 formed in it and configured to receive the stem extension 106. The receiver head 120 may be configured to rotate between an opened position, wherein the stem extension 106 of the stem 102 may be inserted or removed from the stem aperture 126 of the receiver 118, and a closed position wherein the stem extension 106 of the stem 102 may be secured to the receiver 118. The receiver head 120 illustratively may rotate 45 degrees between the opened and closed position, however, it should be appreciated that other ranges of rotation may be implemented according to the disclosure, to facilitate ease of insertion of the stem into the stem aperture. For example, the receiver head may be configured to rotate in a range of angles of about 0-90 degrees relative to an axis along the receiver stanchion 124.

When the stem 102 is not disposed in the stem aperture, the receiver head 120 may be held in an opened position by a spring (not shown), or other means to hold the receiver head 120 open (for example, via friction engagement between the receiver head, pin and receiver stanchion 124, ratchet means, fasteners or the like). Upon insertion of the stem extension 106 of the stem 102 in the stem aperture 126 of the receiver 118, the receiver head 120 may be pivoted down. In this illustrative embodiment, the stem groove or recess 108 in the stem extension 106 engages, and is captured within, a spring clip 128. The spring clip 128 is disposed on and connected to the receiver stanchion 124. When the receiver head 120 is closed, the receiver head 120 may rest against the receiver stanchion 124. In the closed position, the stem extension 106 is held within the stem aperture 126 by the spring clip 128 engaging the stem groove or recess 108. A fastener 130, such as a thumb screw, may be tightened against the stem groove 108. The fastener 130 retains the stem extension 106, held within the stem aperture 126 and the spring clip 128, by engaging the stem groove or recess 108, and prevents movement of the stem 102 and the binocular 140. The fastener 130 may be further configured to prevent rotation of the binocular 140 by frictionally engaging the stem extension 106. Additionally, the fastener 130 may retain the stem 102 within the stem aperture 126 when the receiver head 120 is in the open position. Although a round thumb screw is illustrated, it should be appreciated that other geometrically-shaped screws or knobs, and/or retention mechanisms may be implemented, such as wing nuts, other threaded or friction fit structures, or the like.

FIG. 1B illustrates in further detail the second end 104 of the stem 102 inserted into the stem aperture 126. The receiver head 120 may remain in the open position while the stem 102 is inserted, and in that position the stem 102 with binocular 140 may be inserted or removed from the adapter 110. To secure the binocular 140 to the adapter 110, the receiver head 120 and the stem 102 attached to the binocular 140 are lowered, putting the receiver head 120 into the closed position illustrated further in FIG. 1C. The second end 104 of the stem 102 is received and secured by the spring clip 128, thereby holding the receiver head 120 into the closed position. As a result, the binocular 140 is held in place by the adapter 110. A user may then further secure the binocular 140 in place using the fastener 130 and look through the binocular 140 for a steady and clear picture of a distant object.

Figure 2A:
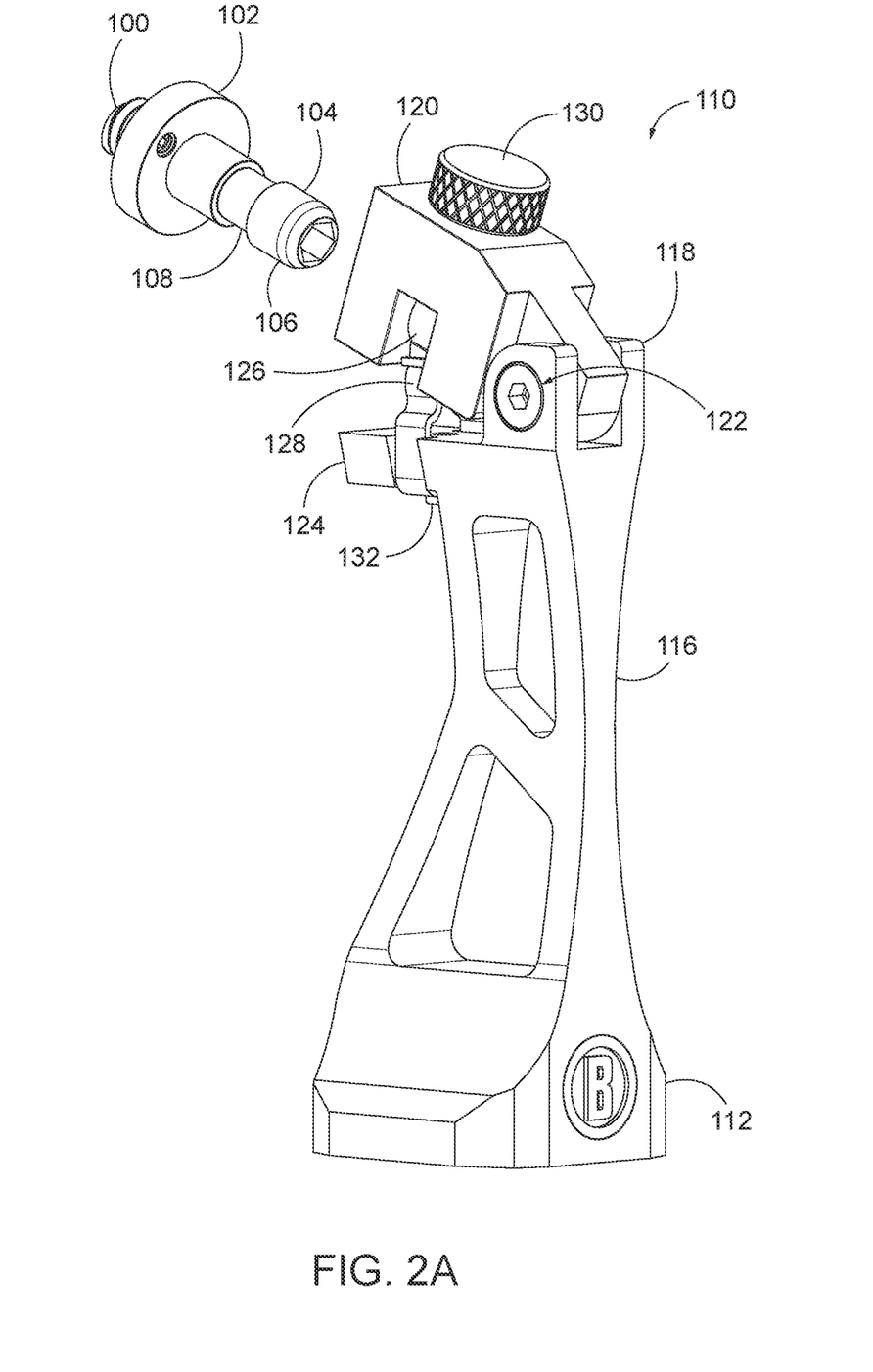
FIG. 2A illustrates an embodiment of a binocular adapter with a stem configured to be inserted into a receiver of the adapter according to the disclosure.
Figure 2B:
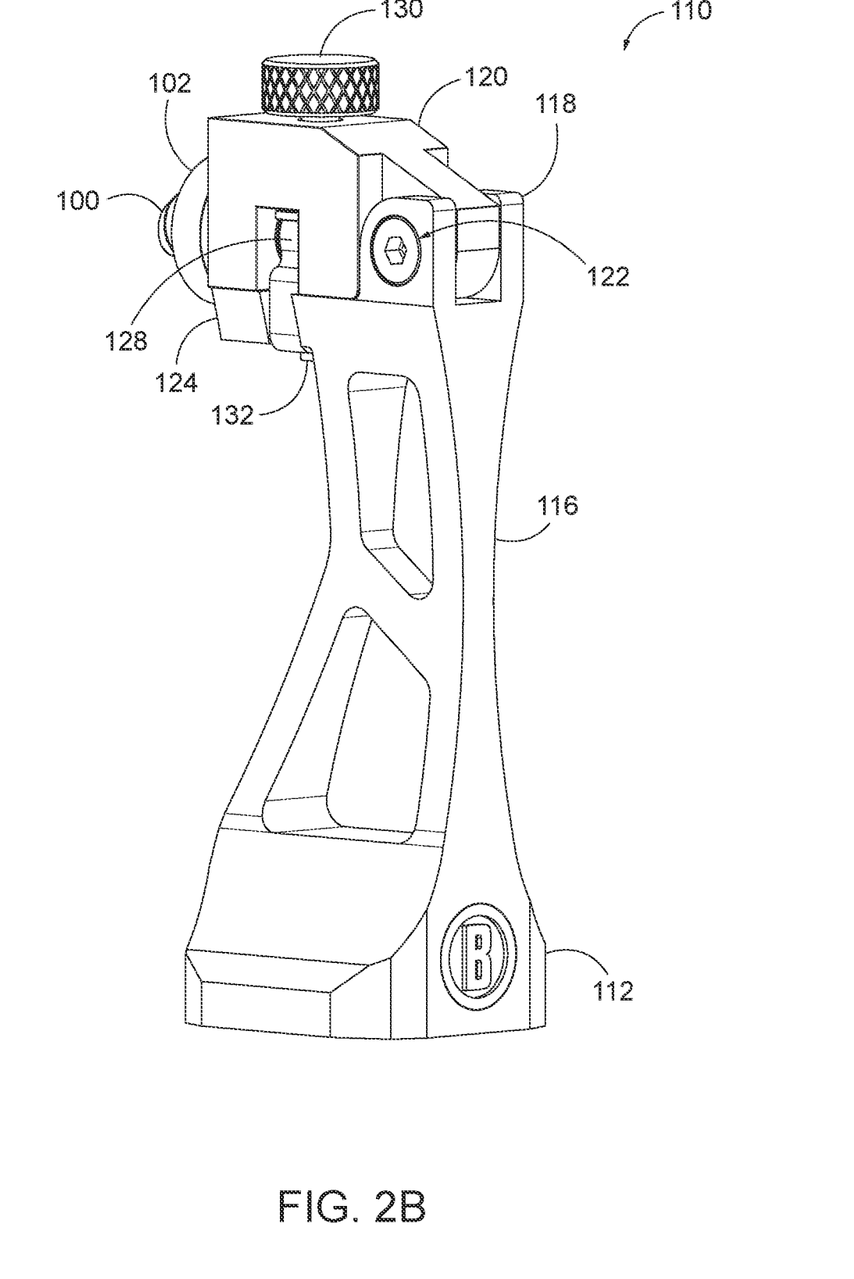
FIG. 2B illustrates the embodiment of the binocular adapter of FIG. 2A with the stem secured in the receiver of the adapter.

FIGS. 2A and 2B further illustrate the embodiment of the binocular adapter 110 with the stem 102 configured to be inserted into the receiver 118 of the adapter 110 according to the disclosure. FIG. 2A further illustrates the embodiment of the binocular adapter 110, according to the disclosure, with the receiver head 120 in the open position. The adapter 110 includes the base 112 connected to the receiver 118 by the stanchion arm 116. The stem 102 includes the first end 100 and the second end 104. The first end 100 may be formed with the male connector such as threads or other connectors as known in the art. The second end 104 may include the stem extension 106 and the stem groove 108. The stem extension 106 may be secured in the stem aperture 126 formed by the receiver head 120. An alternative embodiment of the stem extension 106 may be configured with a hexagonal socket (best seen as 436 of FIG. 4B). The hexagonal socket may be sized for securing the stem 102 to the binocular 140 by inserting a hex drive tool to tighten the first end 100 of the stem 102 to the binocular 140.

The receiver includes the receiver head 120 and the receiver stanchion 124. The receiver head 120 and the receiver stanchion 124 may be interconnected by a rotatable pin 122. As an alternative to the rotatable pin 122, a shoulder screw and at least one washer may be used for reducing unintentional movement of the receiver head 120. The rotatable pin 122 allows the receiver head 120 to rotate between the opened position and the closed position. While the receiver head 120 is in the opened position, the stem extension 106 may be inserted into the stem aperture 226.

FIG. 2B further illustrates the embodiment of the binocular adapter 110 with the receiver head 120 in the closed position with the stem 102 held in place. The spring clip 128 is illustrated engaging the stem groove 108. The spring clip 128 retains the stem groove 108 to secure the stem 102 in place. The spring clip 128 may be fixedly disposed on the receiver stanchion 124. Additionally, the spring clip 128 may be secured by a clip fastener 132. It should be appreciated that the spring clip 128 may be otherwise fastened on the receiver stanchion 124, such as by other hardware, welding, epoxying, or the like. It should be further appreciated that although a spring clip is illustrated as engaging a groove or recess 108 in the stem extension 106, other mechanisms for engaging the stem 102 in the receiver 120 may be implemented such as friction engagement, clasps, extensible pin(s) or the like. The receiver head 120 may include the fastener 130 such as a thumb screw or other fastener for securing the stem 102 in place.

Figure 3A:
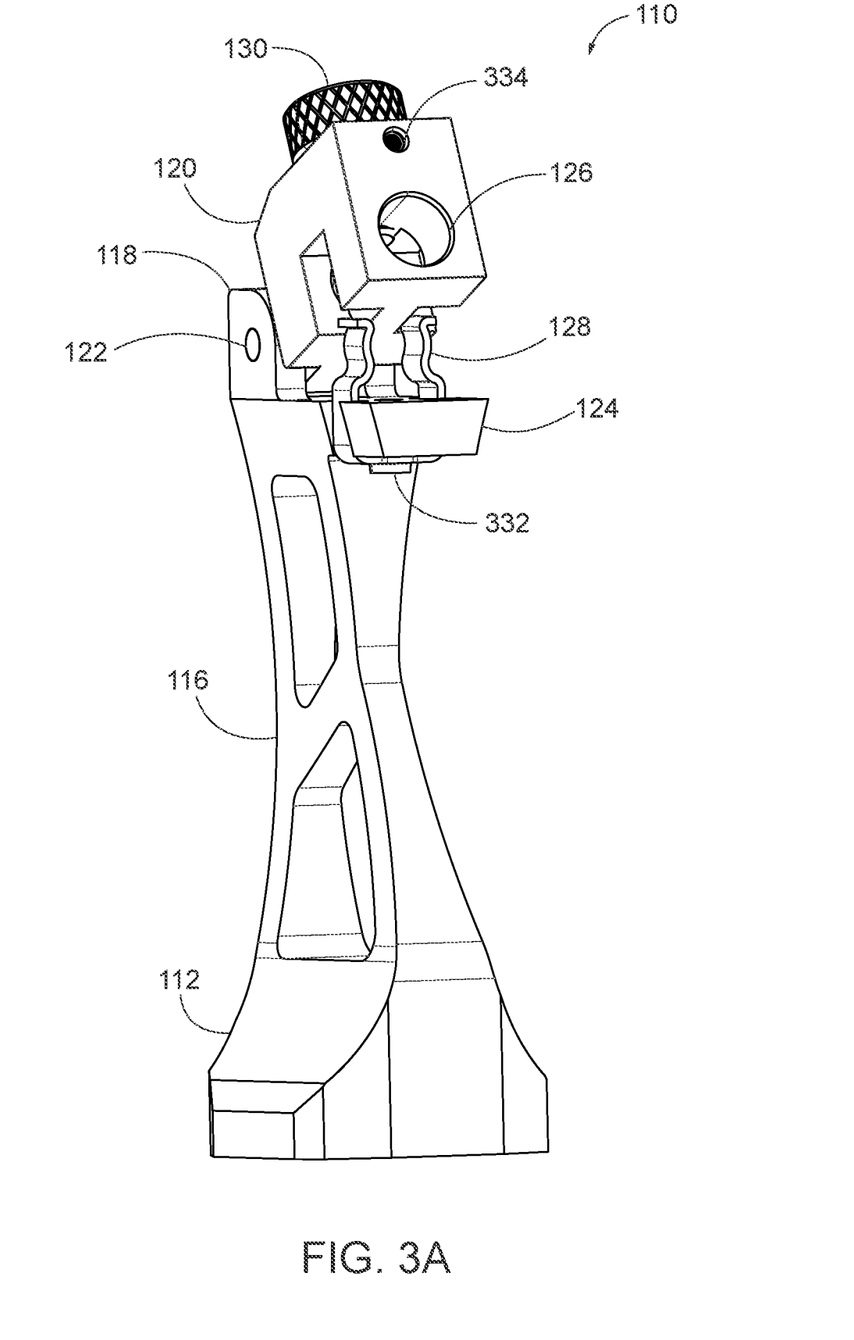
FIG. 3A illustrates a front perspective view of an embodiment of a binocular adapter with an opened receiver according to the disclosure.
Figure 3B:
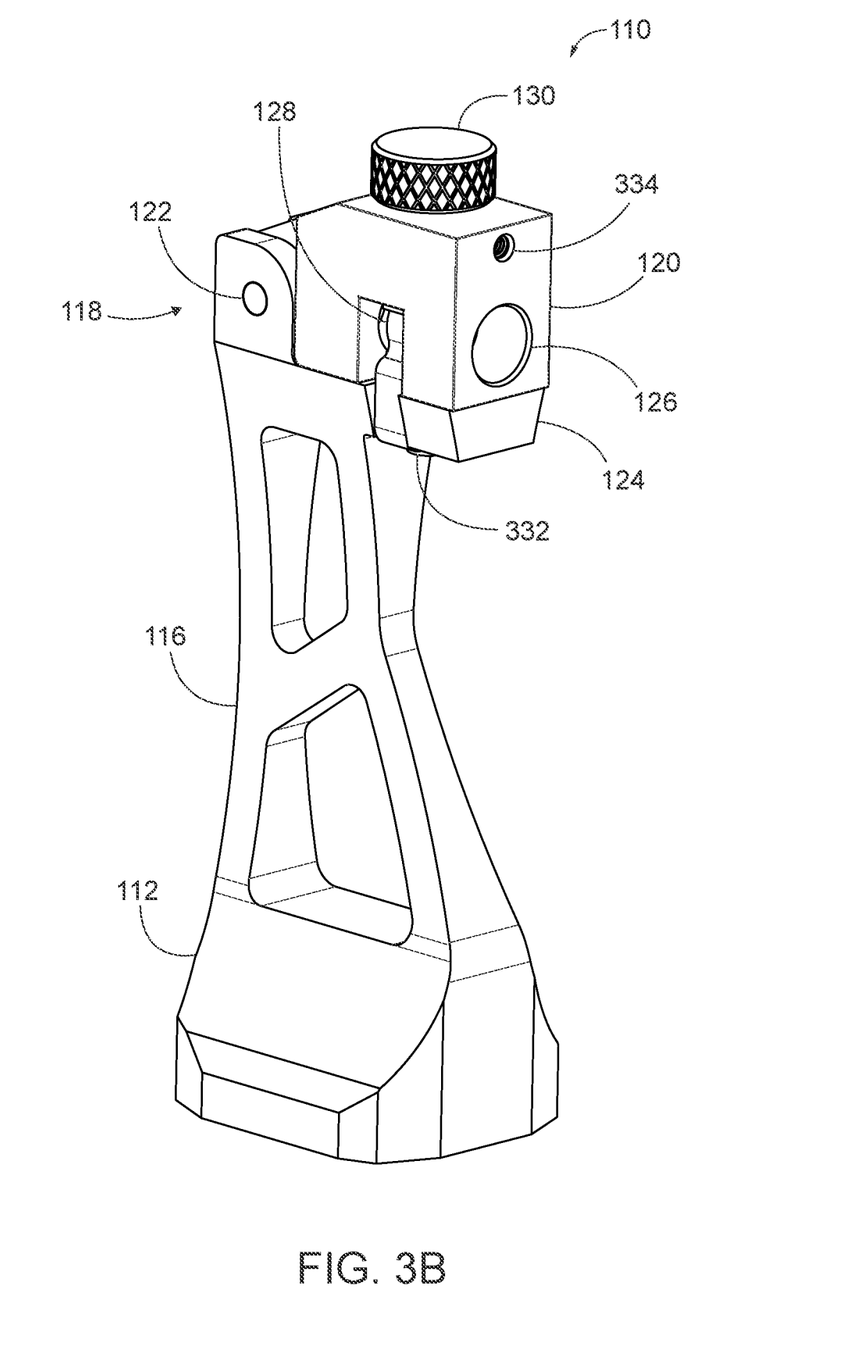
FIG. 3B illustrates a front perspective view of an embodiment of the binocular adapter of FIG. 3A with a closed receiver according to the disclosure.

In order to illustrate further details of the binocular adapter according to the disclosure, FIGS. 3A and 3B illustrate a front perspective view of the embodiment of the binocular adapter 110. FIG. 3A, again, illustrates the binocular adapter 110 with the receiver head 120 in the opened position. While in the opened position, the stem 102 may be inserted into the stem aperture 126. The receiver head 120 may include the thumb screw or fastener 130 for securing the stem 102. The fastener 130 may be held in place using a retention pin or set screw 334. The fastener 130 may be configured to prevent rotation of the binocular 140 by reducing rotation of the stem extension 106. Additionally, the thumb screw may retain the stem 102 within the stem aperture 126 when the receiver head 120 is in the opened position. A screw 332 may be implemented to retain the spring clip 128 in place, and to facilitate replacement of the spring clip 128 in the event that its tension degrades over time. As discussed above, other methods of retaining the spring clip 128 in place may be used without departing from the scope of the disclosure FIG. 3B further illustrates the embodiment of the binocular adapter 110 with the receiver head 120 in the closed position.

Figure 3C:
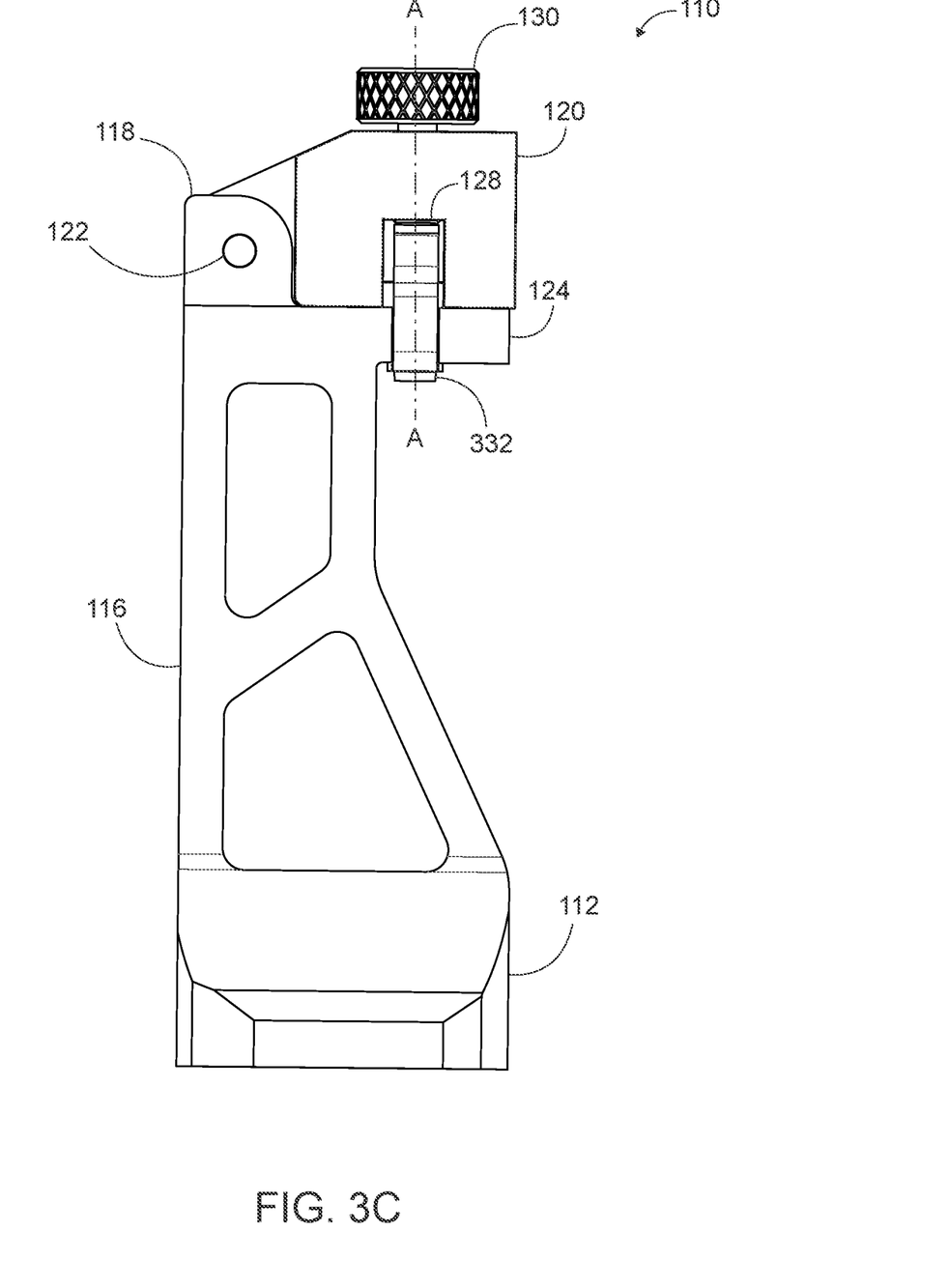
FIG. 3C illustrates a side plan view of the embodiment of the binocular adapter of FIG. 3A with the receiver closed.
Figure 4A:
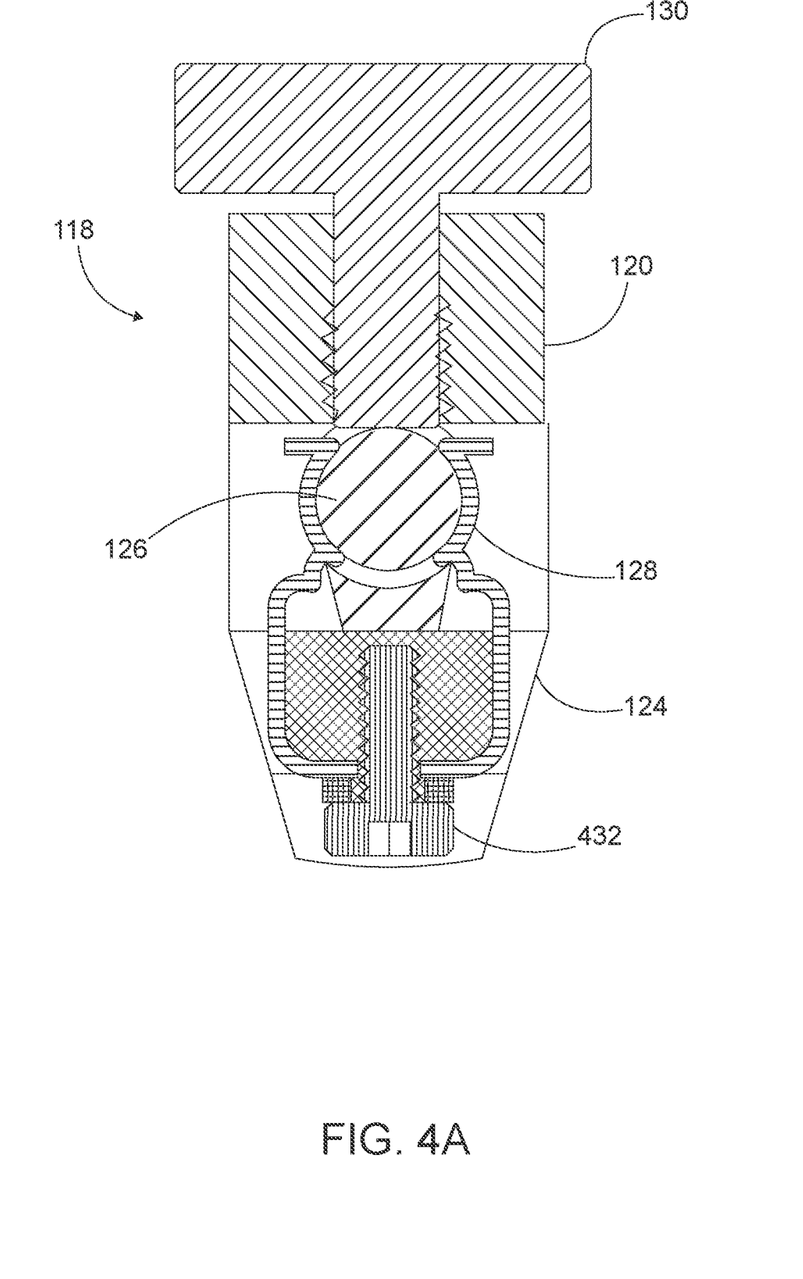
FIG. 4A illustrates a side cross sectional view of the receiver of the binocular adapter taken along line a-a of FIG. 3C.

FIG. 3C illustrates a side plan view of the binocular adapter 110 as shown in FIG. 3B. In FIG. 3C the receiver 118 is illustrated with a section line a-a. FIG. 4A correspondingly illustrates a view in section of the receiver 118 taken along line a-a of FIG. 3C. The receiver head 120 is shown in a closed position abutting the receiver stanchion 124. The receiver head 120 may position the fastener 130 against the stem aperture 426 where the stem 102 may be secured. The screw or clip fastener 432, threaded into a correspondingly threaded recess in the receiver stanchion, may be configured and used to position, secure, and facilitate replacement of the spring clip 128.

Figure 3D:
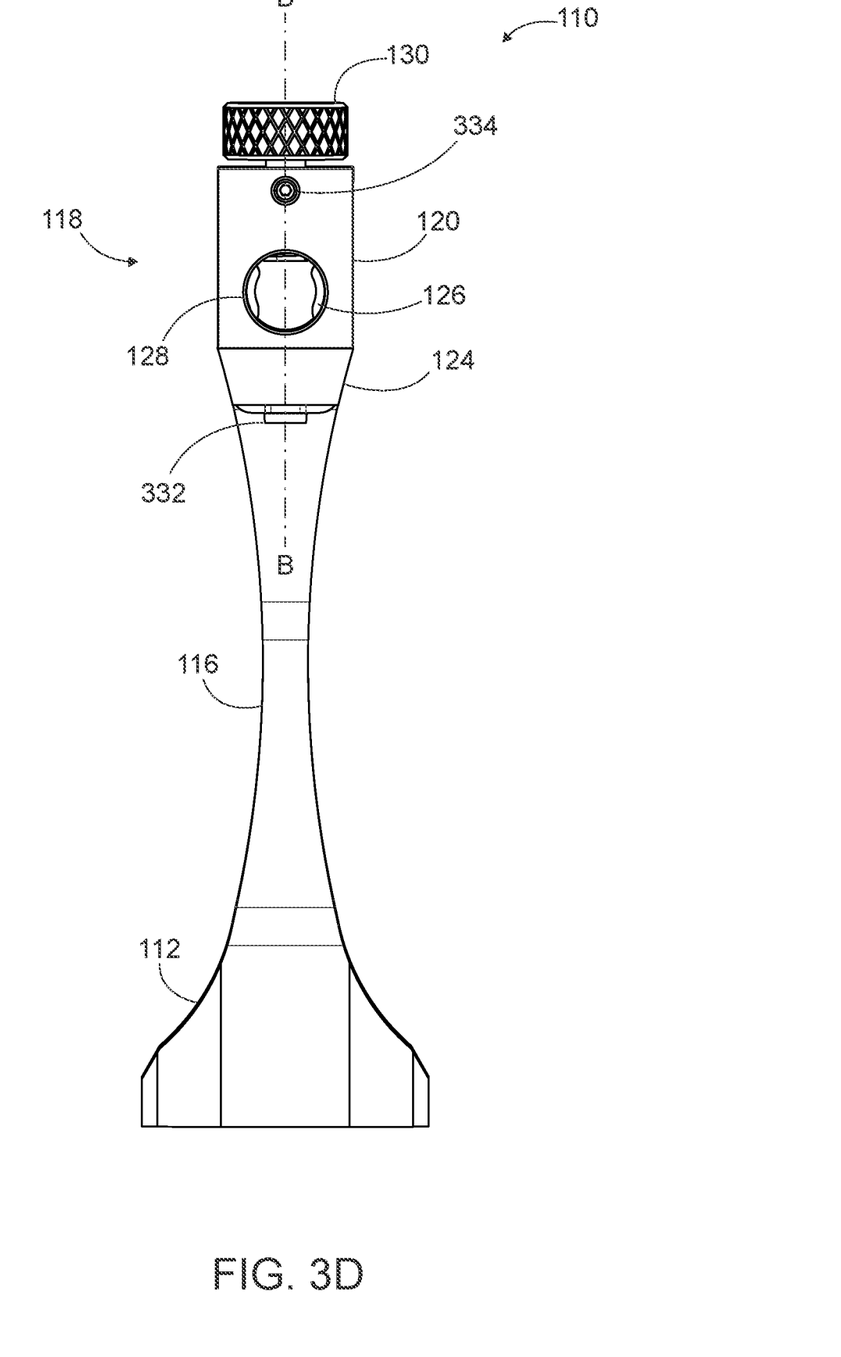
FIG. 3D illustrates a front plan view of the embodiment of the binocular adapter of FIG. 3A with the receiver closed.
Figure 4B:
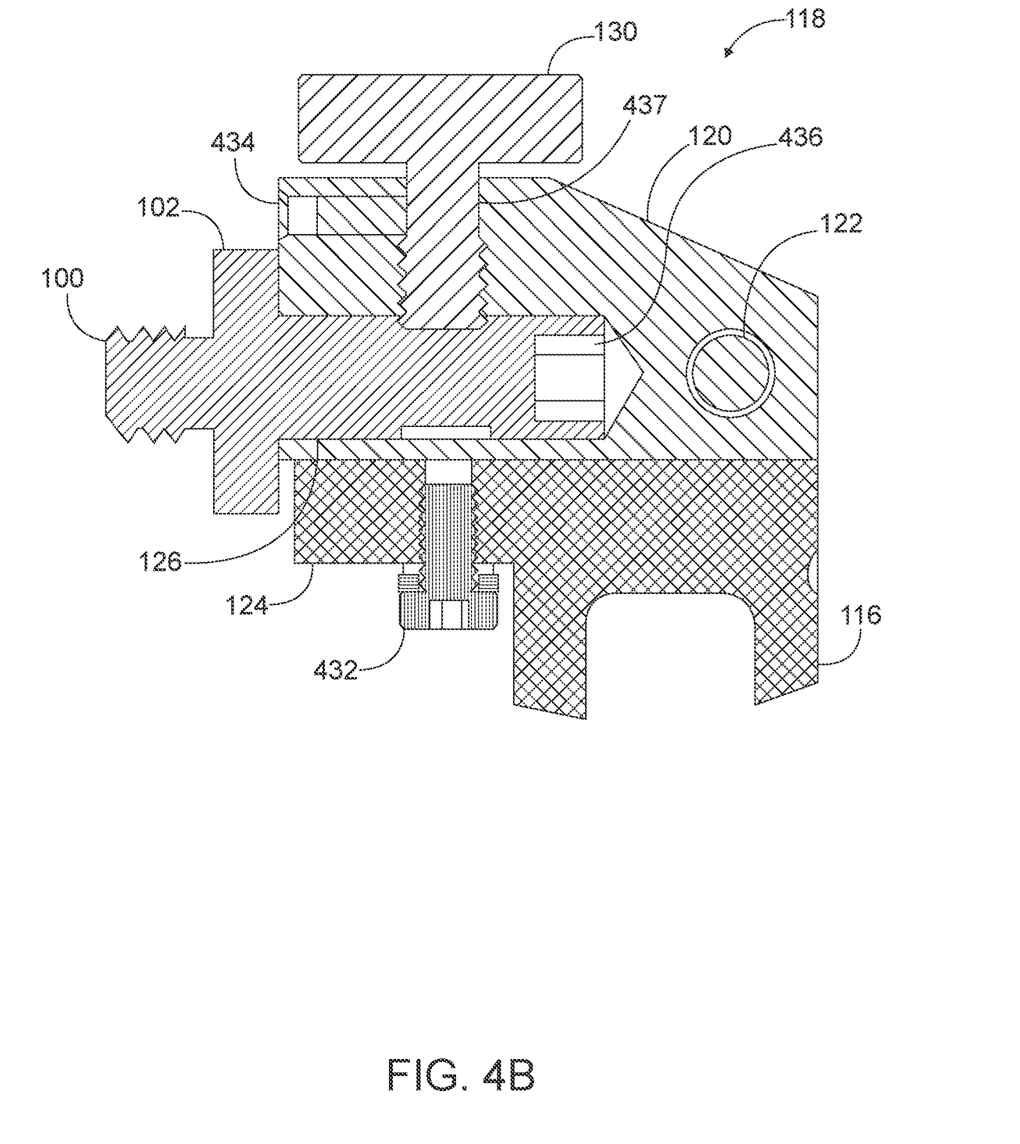
FIG. 4B illustrates a front cross sectional view of the receiver of the binocular adapter taken along line b-b of FIG. 3D.

FIG. 3D illustrates a front plan view of the embodiment of the binocular adapter 110 according to the disclosure. In FIG. 3D the receiver 118 is illustrated with a section line b-b. FIG. 4B correspondingly illustrates a view in section of the receiver 118 taken along line b-b of FIG. 3D. As shown in FIG. 4B, the receiver head 120 is shown in a closed position abutting the receiver stanchion 124. The stem 102 is shown secured in the stem aperture 126. The first end 100 of the stem 102 is shown extending from the receiver 118 for securing to the binocular (not shown). The first end 100 of the stem 102 may include the connector, such as threads, for securing the first end 100 to the binocular (not shown). The stem groove 108 on the stem extension 106 is configured to receive the spring clip 128 and is in alignment with the fastener 130 configured to reduce movement of the stem 102. The fastener 130 may be secured to the receiver head 120 by the retention pin or set screw 434. Further, it should be noted, the fastener 130 may include a partially-threaded shaft 437. The partially-threaded shaft 437 may be configured to interact with the set screw or retention pin 334 to limit travel of the fastener 130. A hexagonal socket 436 may be disposed within the stem aperture 126 and be used to secure the stem 102 to the binocular (as discussed hereinbefore), i.e. using a hex drive tool.

Figure 5:
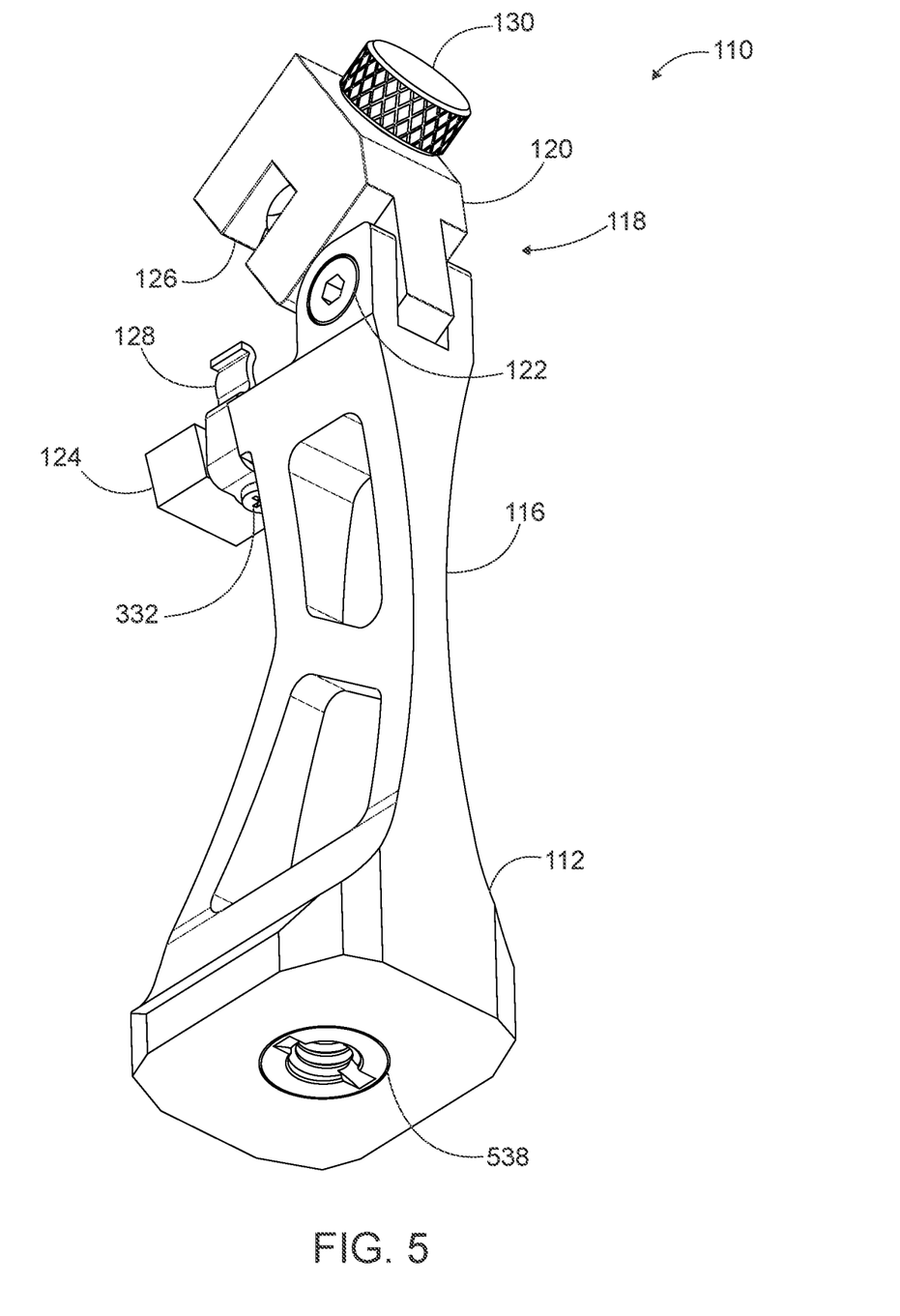
FIG. 5 illustrates a bottom perspective view of an embodiment of a binocular adapter according to the disclosure with the receiver opened.

FIG. 5 illustrates a bottom perspective view of the binocular adapter 110. The binocular adapter base 112 includes a base connector 538 for installing or otherwise attaching the adapter 110 to a platform (shown, for example, in FIG. 1A).

Figure 6:
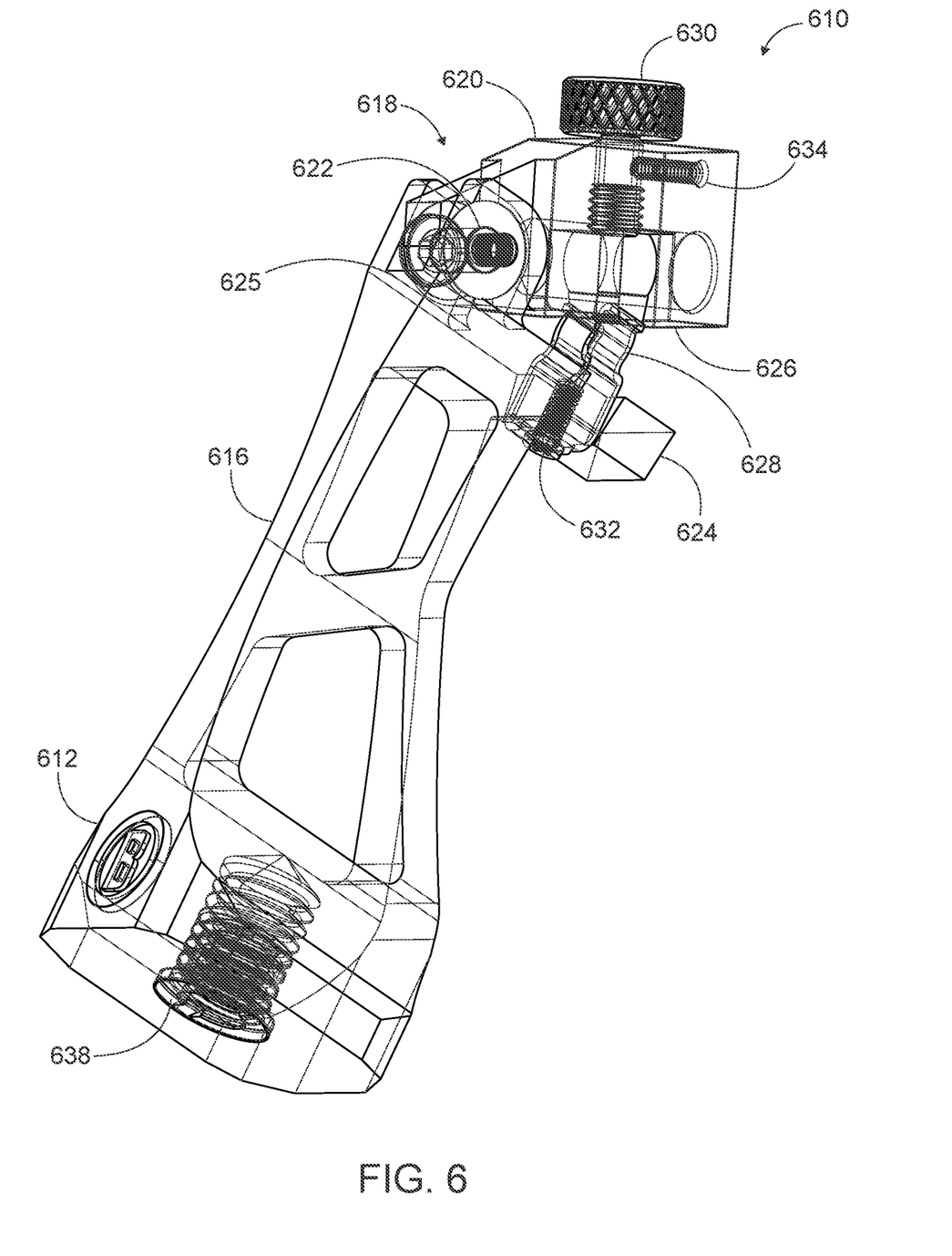
FIG. 6 illustrates an alternative embodiment of a binocular adapter according to the disclosure.

FIG. 6 illustrates an alternative embodiment of the binocular adapter 610 according to the disclosure. The adapter 610 includes a base 612 and a receiver 618 joined by a stanchion arm 616 disposed between the base 612 and the receiver 618. The base 612 includes a base connector 638 for interconnecting the adapter 610 to a platform (not shown), such as on a stand, monopod, bipod, tripod or the like. The base connector 638 may use a threaded female connector to secure the adapter 610 to the platform. It should be understood by one skilled in the art that other methods of securing the adapter 610 to a platform may be substituted without deviating from the scope of the disclosure.

The receiver 618 includes a receiver head 620. The receiver head 620 is connected to a receiver stanchion 624 that extends outwardly from the receiver 620. The connection of the receiver head 620 to the receiver stanchion 624, in this illustrative embodiment, is made using a shoulder screw 622 bracketed on either side by at least one washer such that the receiver head 620 rotates relative to the receiver stanchion 624. Additionally, the receiver head 620 and/or the receiver stanchion 624 may include portions that abut or engage at a point 625 to limit the receiver head's 620 range of motion relative to the receiver stanchion 624.

A spring clip 628 may be disposed on the receiver stanchion 624. Additionally, the spring clip 628 may be secured by a clip fastener 632. It should be appreciated that the spring clip 628 may be otherwise fastened on the receiver stanchion 624, such as by other hardware, welding, epoxy, or the like. It should be further appreciated that alternative embodiments may substitute the spring clip 628 with other retention methods such as friction engagement, clasps, extensible pin(s) or the like without deviating from the disclosure.

The receiver head 620 may include a fastener 630 such as a thumb screw or other fastener for securing a stem (as discussed hereinbefore) in place. The fastener 630 may be held in place using a retention pin or set screw 634. Further, it should be noted, the fastener 630 may include a partially-threaded shaft (best shown in FIG. 4B). The partially-threaded shaft may be configured to interact with the set screw or retention pin 634 to limit travel of the fastener 630 when torque is applied to the fastener 630. The fastener 630 may be configured to prevent rotation of the binocular 140 by reducing rotation of the stem extension 106. Additionally, the fastener or thumb screw 630 may retain the stem 102 within the stem aperture 126 when the receiver head 120 is in the open position.

Although the present disclosure and its advantages have been described in detail, it should be understood that various changes, substitutions and alterations can be made herein without departing from the disclosure as defined by the appended claims. Moreover, the scope of the present application is not intended to be limited to the particular configurations described in this specification. As one of ordinary skill in the art will readily appreciate from the disclosure that presently existing or later to be developed features or elements that perform substantially the same function or achieve substantially the same result as the corresponding configurations described herein may be utilized according to the present disclosure. Accordingly, the appended claims are intended to include within their scope features or elements.

It should be understood that when an element is referred to as being "connected" or "coupled" to another element (or variations thereof), it can be directly connected or coupled to the other element or intervening elements may be present.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure.

Further, it should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The words "illustrative" or "exemplary" are used herein to mean "serving as an example, instance, or illustration." Any aspect described herein as "illustrative" or "exemplary" is not necessarily to be construed as preferred or advantageous over other aspects.

Although embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims.

What is claimed is:

1. A binocular adapter comprising:
    a base including a base connector configured to receive a platform connector;
    a stanchion arm connected to the base;
    a receiver connected to the stanchion arm distal from the base, the receiver comprising a receiver head defining a stem aperture and a receiver stanchion having a spring clip fixedly disposed thereon, the receiver head and receiver stanchion being pivotably connected to allow the receiver head and receiver stanchion to actuate between an open position and a closed position,
    a binocular stem comprising a first end configured to connect to a binocular, and a second end distal to the first end including a stem extension configured to be received by the stem aperture of the receiver head, the stem extension sized to be engaged by the spring clip;
    wherein the receiver head being configured to receive the stem extension attached to the binocular into the stem aperture when the receiver head and receiver stanchion are in the open position, the spring clip being configured to engage and fix the stem extension in the receiver head when the stem extension is present in the stem aperture and the receiver head and receiver stanchion are in the closed position.

2. The binocular adapter of claim 1 wherein the receiver head is connected to the receiver stanchion by one of a pin or a shoulder screw and the receiver head rotates about the pin or the shoulder screw to allow the receiver head and receiver stanchion to actuate between the open position and the closed position.

3. The binocular adapter of claim 1 wherein the base, stanchion arm and at least a portion of the receiver are formed as a unitary structure.

4. The binocular adapter of claim 1 further including a fastener disposed through a portion of the receiver head and configured to secure the binocular stem within the stem aperture.

5. The binocular adapter of claim 1 wherein the first end of the binocular stem is configured having a threaded male connector configured to connect to the binocular.

6. The binocular adapter of claim 4 further wherein the fastener disposed through a portion of the receiver head is a thumb screw configured to secure the binocular stem within the stem aperture.

7. A binocular adapter configured to receive a stem extension attached to a binocular, the binocular adapter comprising:
    a base configured to be fixedly disposed on a platform;
    a stanchion arm connected to the base;
    a receiver connected to the stanchion arm distal from the base, the receiver comprising a receiver head defining a stem aperture for receiving the stem extension and a receiver stanchion having a stem extension engagement member fixedly disposed thereon adapted to engage the stem extension, the receiver head and receiver stanchion being pivotably connected to allow the receiver head and receiver stanchion to actuate between an open position and a closed position, the receiver head being configured to receive the stem extension attached to the binocular into the stem aperture when the receiver head and receiver stanchion are in the open position, the stem extension engagement member being configured to engage and fix the stem extension in the receiver head when the stem extension is present in the stem aperture and the receiver head and receiver stanchion are in the closed position.

8. The binocular adapter of claim 7 wherein the base includes a connector configured to receive a platform connector to fixedly dispose the base on the platform.

9. The binocular adapter of claim 7 wherein the receiver stanchion extends outwardly from the receiver.

10. The binocular adapter of claim 9 wherein a portion of the receiver head abuts a portion of the receiver stanchion when the receiver head and the receiver stanchion are the closed position.

11. The binocular adapter of claim 7, wherein the stem extension engagement member is a spring clip, a clasp or an extensible pin.

12. The binocular adapter of claim 7 wherein the stem extension attached to the binocular comprises a first end configured to connect to the binocular, and a second end distal to the first end configured to be received by the stem aperture of the receiver head, the stem extension having a groove sized to be engaged by the stem extension engagement member.

13. The binocular adapter of claim 12 wherein the groove of the stem extension is configured to engage the stem extension engagement member when the receiver head and the receiver stanchion are in the closed position.

14. A binocular adapter comprising:
a base including a base connector configured to receive a platform connector;
a stanchion arm connected to the base;
a receiver connected to the stanchion arm distal from the base, the receiver comprising a receiver head defining a stem aperture and a receiver stanchion having a spring clip fixedly disposed thereon, the receiver head and receiver stanchion being pivotably connected to allow the receiver head and receiver stanchion to actuate between an open position and a closed position,
a binocular stem comprising a first end configured to connect to a binocular, and a second end distal to the first end including a stem extension configured to be received by the stem aperture of the receiver head;
wherein when the receiver head and receiver stanchion are in the open position the stem extension can be inserted into the stem aperture, and wherein when the binocular stem is present in the stem aperture and the receiver head and the receiver stanchion are in the closed position the stem extension is held within the stem aperture.

15. The binocular adapter of claim 14 wherein a portion of the receiver head abuts a portion of the receiver stanchion when the receiver head and the receiver stanchion are in the closed position.

16. The binocular adapter of claim 15, wherein the receiver stanchion includes a spring clip disposed thereon, and the stem extension has a groove disposed thereon sized to be engaged by the spring clip when the stem extension is disposed in the stem aperture and the receiver head and the receiver stanchion are in the closed position.

17. The binocular adapter of claim 15, wherein the receiver head is connected to the receiver stanchion by a pin and the receiver head rotates about the pin to allow the receiver head and the receiver stanchion to actuate between the open position and the closed position.

18. The binocular adapter of claim 14 wherein the base, stanchion arm and at least a portion of the receiver are formed as a unitary structure.

19. The binocular adapter of claim 14 further including a fastener disposed through a portion of the receiver head and configured to secure the binocular stem within the stem aperture.

20. The binocular adapter of claim 19 further wherein the fastener disposed through a portion of the receiver head is a thumb screw configured to secure the binocular stem within the stem aperture.

* * * * *